(12) United States Patent
Chanda et al.

(10) Patent No.: US 10,637,809 B2
(45) Date of Patent: Apr. 28, 2020

(54) METHOD AND APPARATUS FOR AUTOMATICALLY UPLOADING AN ATTACHED DOCUMENT TO A DEVICE

(71) Applicant: BlackBerry Limited, Waterloo (CA)

(72) Inventors: Rupen Chanda, San Francisco, CA (US); Antti Juhani Piira, Sunnyvale, CA (US)

(73) Assignee: BlackBerry Limited, Waterloo (CA)

(*) Notice: Subject to any disclaimer, the term of this patent is extended or adjusted under 35 U.S.C. 154(b) by 52 days.

(21) Appl. No.: 15/247,734

(22) Filed: Aug. 25, 2016

(65) Prior Publication Data
US 2018/0063050 A1 Mar. 1, 2018

(51) Int. Cl.
*G06F 15/16* (2006.01)
*H04L 12/58* (2006.01)
*G06Q 10/10* (2012.01)
*H04W 4/12* (2009.01)

(52) U.S. Cl.
CPC .......... *H04L 51/08* (2013.01); *G06Q 10/107* (2013.01); *H04W 4/12* (2013.01)

(58) Field of Classification Search
CPC .......................... H04L 51/08; G06F 17/30011
USPC .................................................... 709/204, 206
See application file for complete search history.

(56) References Cited

U.S. PATENT DOCUMENTS

| | | | | |
|---|---|---|---|---|
| 5,903,723 A | * | 5/1999 | Beck | G06Q 10/107 709/200 |
| 7,420,702 B1 | | 9/2008 | Buschi et al. | |
| 2006/0031309 A1 | * | 2/2006 | Luoffo | G06Q 10/107 709/206 |
| 2009/0234863 A1 | * | 9/2009 | Evans | G06Q 10/107 |
| 2012/0278405 A1 | * | 11/2012 | Costenaro | H04L 67/2857 709/206 |
| 2014/0181223 A1 | | 6/2014 | Homsany et al. | |
| 2015/0195220 A1 | * | 7/2015 | Hawker | H04L 51/02 709/206 |

FOREIGN PATENT DOCUMENTS

| | | | |
|---|---|---|---|
| EP | 1164757 A2 | * 12/2001 | ......... H04L 51/063 |
| EP | 1164757 A2 | 12/2001 | |

OTHER PUBLICATIONS

European Patent Application No. 17185753.5, European Search Report dated Sep. 20, 2017.
European Patent Application No. 17185753.5, Office Action dated Oct. 1, 2019.

* cited by examiner

*Primary Examiner* — Wing F Chan
*Assistant Examiner* — Andrew Woo
(74) *Attorney, Agent, or Firm* — Borden Ladner Gervais LLP; Todd Keeler

(57) ABSTRACT

A method and electronic device are provided to determine that a text-based message to be sent from a sender to a recipient includes a document attached thereto, determine a probability value for a portable electronic device associated with the recipient based at least on behavioural data associated with the recipient, in response to determining that the probability value meets a threshold, cause the portable electronic device to automatically download the document to a memory of the portable electronic device associated with the recipient, and transmit the text-based message.

14 Claims, 5 Drawing Sheets

METHOD AND APPARATUS FOR AUTOMATICALLY UPLOADING AN ATTACHED DOCUMENT TO A DEVICE

FIELD

The present disclosure relates generally to uploading attached documents to a device such as, for example, a portable electronic device.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart phones, wireless personal digital assistants (PDAs), and laptop computers with wireless 802.11 or Bluetooth® capabilities.

Electronic devices may be utilized to share documents by, for example, attaching the document to an email or text message. The recipient of the message with attached document may wish to open the attached document on a portable electronic device. Generally, documents that are attached to a message are not included when the message is transmitted to the portable electronic device and a recipient must separately download the document if the recipient wishes to view the document on the portable electronic device.

Improvements in electronic devices are desirable.

SUMMARY

One aspect of the disclosure provides a method for an electronic device for sending and receiving text-based messages that includes determining that a text-based message to be sent from a sender to a recipient includes a document attached thereto, determining a probability value for a portable electronic device associated with the recipient based at least on behavioural data associated with the recipient, in response to determining that the probability value meets a threshold, causing the portable electronic device to automatically download the document to a memory of the portable electronic device associated with the recipient, and transmitting the text-based message.

In a further aspect, the method includes removing the document attached to the text-based message and storing the document in a shared database, and including, in the text-based message, a link to the document stored in the shared database, wherein causing the portable electronic device to automatically download the document comprises causing the portable electronic device to automatically download the document from the shared database.

In a further aspect, the behavioural data includes data that the recipient has previously opened a document attached to a previous text-based message.

In a further aspect, the text-based message is associated with a thread of previous text-based messages, and wherein the behavioural data includes data a determination that the recipient has been active in the thread of text-based messages.

In a further aspect, the recipient is determined to be active in a thread of text-based messages if percentages of text-based messages of the thread that the recipient is the sender meets a predetermined percentage threshold.

In a further aspect, the behavioural data includes a determination that the recipient has previously opened at the portable electronic device a document attached to previous text-based message from the sender.

In a further aspect, the behavioural data includes a determination that the user has previously opened at the portable electronic device a document attached to a previous text-based message within a predetermined time period.

In a further aspect, the probability value is further based on whether the document includes a comment directed to the recipient.

In a further aspect, the probability value is further based on an intent determined by performing natural language processing based heuristics on the content of the text-based message.

In a further aspect, the method further includes determining whether a memory of the portable electronic device includes sufficient free memory space to store the document, wherein causing the portable electronic device to automatically download the document to the memory is performed in response to determining that the memory of the portable electronic device includes sufficient free memory space, and in response to determining that the memory of the portable electronic device does not include sufficient free memory space, determining whether any stored documents stored in the memory may be deleted from the memory to create sufficient free memory space, and in response to determining that the memory includes documents that may be deleted from the memory to create sufficient free space, causing the portable electronic device to delete to the determined stored documents prior to causing the portable electronic device to automatically download the document to the memory.

Another aspect of the present disclosure provides an electronic device for sending and receiving text-based messages that includes a processor configured to determine that a text-based message to be sent from a sender to a recipient includes a document attached thereto, determine a probability value for a portable electronic device associated with the recipient based at least on behavioural data associated with the recipient, in response to determining that the probability value meets a threshold, cause the portable electronic device to automatically download the document to a memory of the portable electronic device associated with the recipient, and transmit the text-based message.

In a further aspect, the processor is further configured to remove the document attached to the text-based message and storing the document in a shared database, and include, in the text-based message, a link to the document stored in the shared database, wherein causing the portable electronic device to automatically download the document comprises causing the portable electronic device to automatically download the document from the shared database.

In a further aspect, the behavioural data includes data that the recipient has previously opened a document attached to a previous text-based message.

In a further aspect, the text-based message is associated with a thread of previous text-based messages, and wherein the behavioural data includes data a determination that the recipient has been active in the thread of text-based messages.

In a further aspect, the recipient is determined to be active in a thread of text-based messages if percentages of text-based messages of the thread that the recipient is the sender meets a predetermined percentage threshold.

In a further aspect, the behavioural data includes a determination that the recipient has previously opened at the portable electronic device a document attached to previous text-based message from the sender.

In a further aspect, the behavioural data includes a determination that the user has previously opened at the portable electronic device a document attached to a previous text-based message within a predetermined time period.

In a further aspect, the probability value is further based on whether the document includes a comment directed to the recipient.

In a further aspect, the probability value is further based on an intent determined by performing natural language processing based heuristics on the content of the text-based message.

In a further aspect, the is further configured to determine whether a memory of the portable electronic device includes sufficient free memory space to store the document, wherein causing the portable electronic device to automatically download the document to the memory is performed in response to determining that the memory of the portable electronic device includes sufficient free memory space, and in response to determining that the memory of the portable electronic device does not include sufficient free memory space, determine whether any stored documents stored in the memory may be deleted from the memory to create sufficient free memory space, and in response to determining that the memory includes documents that may be deleted from the memory to create sufficient free space, cause the portable electronic device to delete to the determined stored documents prior to causing the portable electronic device to automatically download the document to the memory.

BRIEF DESCRIPTION OF THE DRAWINGS

Embodiments of the present disclosure will now be described, by way of example only, with reference to the attached figures, in which.

DETAILED DESCRIPTION

Figure 1:
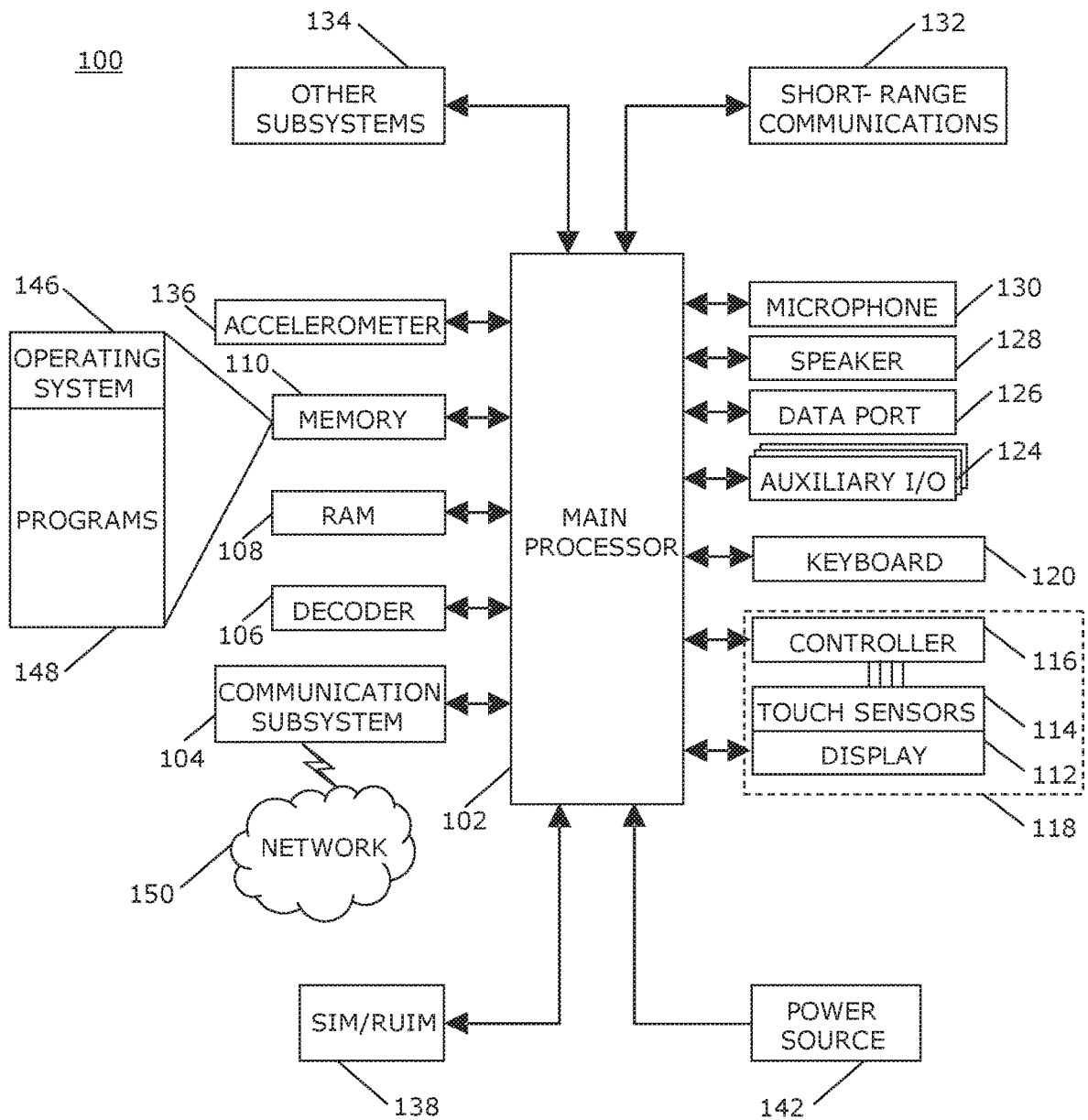
FIG. 1 is a block diagram of an example of a portable electronic device in accordance with the disclosure.

The following describes an electronic device and method for automatically uploading a document attached to a text-based message to a portable electronic device. For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device, such as a portable electronic device as described herein. Examples of electronic devices include mobile, or handheld, wireless communication devices such as cellular phones, cellular smart-phones, wireless organizers, personal digital assistants, wirelessly enabled notebook computers, tablet computers, mobile internet devices, electronic navigation devices, and so forth. Other examples of electronic devices include devices that are not handheld devices or that may not be wireless communication devices such as desktop computers.

A block diagram of an example of an electronic device 100, which in the present example is a portable electronic device, is shown in FIG. 1. The electronic device 100 includes multiple components, such as a processor 102 that controls the overall operation of the electronic device 100. Communication functions, including data and voice communications, are performed through a communication subsystem 104. Data received by the electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the electronic device 100.

The processor 102 interacts with other components, such as a Random Access Memory (RAM) 108, memory 110, a touch-sensitive display 118, a keyboard 120, an auxiliary input/output (I/O) subsystem 124, a data port 126, a speaker 128, a microphone 130, short-range communications 132 and other device subsystems 134. The speaker 128, also referred to as an earpiece speaker, is utilized to output audible signals when a user's ear is very close to the speaker 128. Although not shown, the processor may also interact with a loudspeaker, for example, for hands-free use. The keyboard 120 includes a plurality of keys, which may be mechanical keys that include mechanical switches or contacts for input to the electronic device 100 when a mechanical key of the keyboard is depressed by a sufficient amount to oppose a bias of the mechanical key. Alternatively, or in addition, the keys of the keyboard may include touch sensors coupled to a controller to detect touch input thereon.

The touch-sensitive display 118 includes a display 112 and touch sensors 114 that are coupled to at least one controller 116 that is utilized to interact with the processor 102. Input via a graphical user interface is provided via the touch-sensitive display 118. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

To identify a subscriber for network access, the electronic device 100 may utilize a Subscriber Identity Module or a Removable User Identity Module (SIM/RUIM) card 138 for communication with a network, such as the wireless network 150. Alternatively, user identification information may be programmed into memory 110.

The electronic device 100 includes an operating system 146 and software programs, applications, or components 148 that are executed by the processor 102 and are typically stored in a persistent, updatable store such as the memory 110. Additional applications or programs may be loaded onto the electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive touch-sensitive display that includes a plurality of capacitive touch sensors 114. Capacitive touch sensors 114 include drive electrodes, also known as transmission electrodes, and sense electrodes, also known as receive electrodes. The drive electrodes generally extend in one direction and cross over or under the sense electrodes, which generally extend in another direction, generally at right angles to the direction that the drive electrodes extend, to form a grid pattern. The drive electrodes are spaced from the sense electrodes by a dielectric material. The points at which the drive electrodes and the sense electrodes cross each other are referred to as nodes. The drive and sense electrodes may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus, pen, or other pointer, depending on the nature of the touch-sensitive display 118. Multiple simultaneous touches may be detected.

Figure 2:
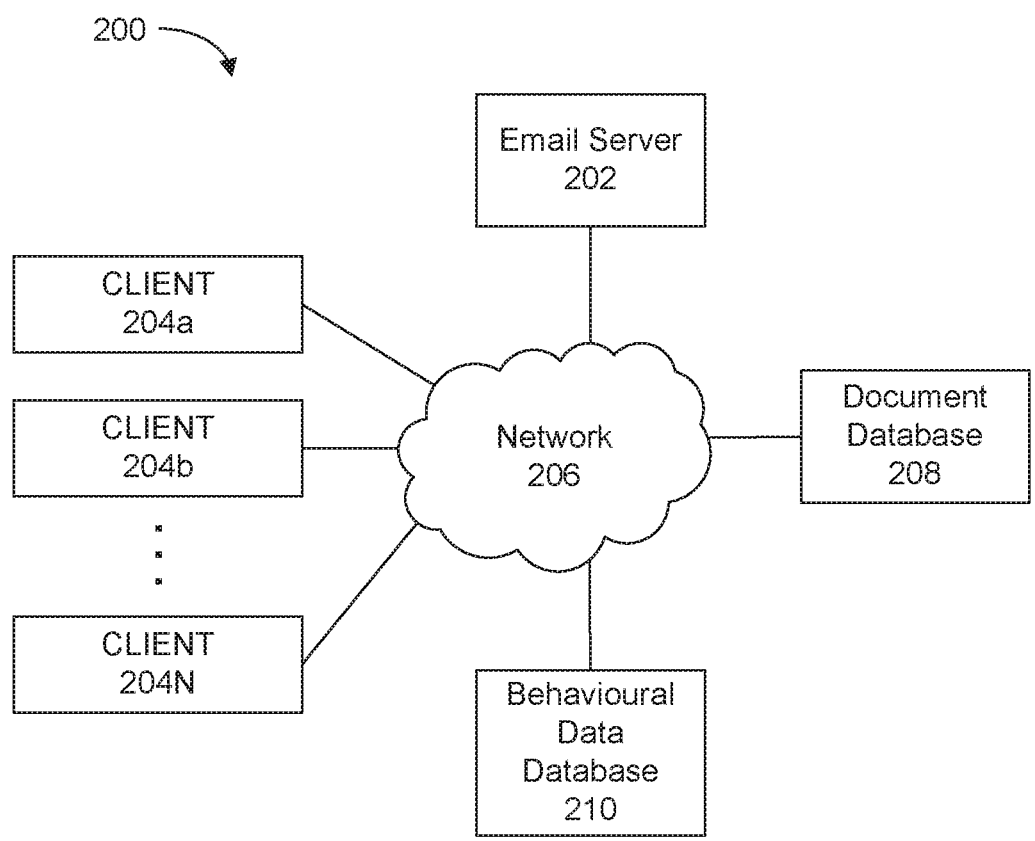
FIG. 2 is a block diagram of a system for sending text-based messages having documents attached in accordance with the disclosure.

In order for an electronic device 100 to send and receive text-based messages, the electronic device 100 communicates with a messaging server. A block diagram of an example system 200 for sending a text-based communication in accordance with the present disclosure is shown in FIG. 2.

The system 200 includes a messaging server 202 and one or more clients 204a-204N. The clients 204a-204N may each be, for example, electronic devices 100 described above with respect to FIG. 1. Each client 204a-204N communicates with the server 202 via the network 206. The network 206 may be any suitable type of communication network including, for example, a local area network (LAN) connection, a wide area network (WAN) connection, an internet connection, a cellular connection, or any combination thereof. The network 206 may be wired, wireless, or a combination of wired and wireless. The system 200 also includes a document database 208 and a behavioural data database 210 connected to the network 206 to facilitate communication with the clients 204a-204N and the messaging server 202.

The document database 208 is a shared database of electronic documents that is accessible by the clients 204a-204N and the messaging server 202 via the network 206. "Documents", as the term is used herein, may refer to any type of electronic file including, for example, word processor files, spreadsheets, emails, instant messages, group chat messages, calendar data files such as for example scheduled calendar events, picture files, presentations, tasks, and program code.

The document database 208 may be, for example, a cloud-based document sharing service, or may form part of a collaborative workspace. A collaborative workspace is a network-based environment that enables multiple users to work in collaboration with one another. In general, a collaborative workspace may be associated with a particular project and multiple users of the collaborative workspace may be members of a team that is associated with the project. Documents and other materials, such as for example text documents, scheduled meeting data, tasks, and other electronic file associated with the project, may be stored in the collaborative workspace such that project members may access these documents via the network to review and edit the documents utilizing various tools that may be available within the collaborative workspace.

The clients 204a-204N may access documents stored in the document database 208 through a document access application stored on the client 204a-204N. The document access application may be utilized, for example, to synchronize versions of documents stored on the document database 208 with the version stored locally on the clients 204a-204N. For example, if a modification is made to a document stored locally at one of the clients 204a-204N, the change may be incorporated to the other versions of the documents stored in the document database 208 and locally at the other clients 204a-204N. In this way, all users will always be utilizing the same version of a document, particularly in a collaborative workspace environment where more than one person may be reviewing and editing a document over time.

The documents stored in the document database 208 may each have an associated protection setting that may limit access to document. Protection settings may include, for example, various permissions that different users have with respect to the document. Examples of permissions include permissions to modify the document, to print to document, and to share the document.

The protection settings may be implemented by encryption of the documents stored in the document database 208. In an example, the protection settings of a document that are associated with a user, such as a recipient of the text-based message in which the document is attached, may be stored in a database such as, for example the document database 208. When a user attempts to access the document, or perform some other operation with respect of the document including modifying, saving, printing, and sharing the document, a determination is made, based on the stored protection setting for that user, whether the user has permission to perform the operation being attempted. If the user is determined to have permission to access the document, or perform the other operation with respect of the document, a decryption key is sent to the user such that the user is able to decrypt the encrypted document to facilitate the user accessing the document or performing the other desired operation. A viewer, such as a word processing program or any other suitable program for viewing the document, utilized by the user to access the document receives the decryption key as well as a policy file that sets out what functionality is allowed for the user. The viewer, based on the policy file, enforces the protection settings associated with the user when the user accesses the document.

In some examples, when a document is attached to a text-based message sent from a sender to a recipient, the messaging server 202 removes the document from the text-based message, stores the document in the document database 208, and includes a link to the stored document within the text-based message prior to transmitting the text-based message to clients 204a-204N associated with the recipient. By replacing the attached document with a link to a stored version of the document in the document database 208, protection settings and encryption may be applied to the attachments, increasing security of the document. Further, linking to a stored version in a document database 208 provides a single version of the document in the event that multiple recipients of the text-based message are potentially accessing and modifying the document.

The behavioural data database 210 is a database of information, such as, for example, metadata related to text-based messages that have been previously sent or received by the messaging server 202, herein referred to as behavioural data. The behavioural data database 210 may include, for example, behavioural data related to all of the text-based messages sent or received by the messaging server 202. Alternatively, the behavioural data database 210 may include, for example, behavioural data related to text-based messages sent or received by certain users only, such as users associated with a particular organization.

The behavioural data stored in the behavioural data database 210 may include personal information associated with the individuals who are the sender and the recipients of a previous text-based message such as, for example, any or all of a name, an email address, an organization associated with the individual, and the like. A text-based message may be sent to multiple recipients and, in this case, the personal information stored as collaboration data may include the personal information for each of the recipients of the text-based message. Further, the text-based message may be associated with other text-based message, known as a thread. The behavioural data may include information regarding associations between test-based messages that are part of a common thread of text-based messages. The behavioural data stored in the behavioural data database 210 may also include information regarding any documents attached to a previously transmitted text-based message. A document may be considered to be "attached" to the text-based message if a copy of a document is included with the text-based message or if a link in the message to a copy of the document stored in a shared database such as the document database 208 is included in the text-based message. The behavioural data associated the attached document may include, for example, any or all of the document name, the contents of the document, the document version, protection settings or permissions, if any, applied to the document, which recipients of the text-based message opened or accessed the attached document, and what client 204a-204N associated with the recipient the attached document was opened or accessed on.

Each time a text-based message is transmitted by the message server 202 the message server 202 may update the behavioural data database 210 with behavioural data associated with the text-based message. Further, the message server 202 may update the behavioural data database 210 whenever a document attached to a text-based message is opened or downloaded by one of the clients 204a-204N. For example, when a text-based message is sent to a client 204a-204N that is a portable electronic device, such as a mobile phone or tablet, any attached documents are not transmitted with the text-based message in order to reduce the amount of data transmitted. When a recipient wishes to open an attachment on a client 204a-204N that is a portable electronic device, the client 204a-204N must download the document via the messaging server 202 or the document database 208. In response to a client 204a-204N downloading the document, the behavioural data database 210 may be updated with, for example, information regarding what client 204a-204N opened the attached document. In another example, the attached document may be encrypted such that, in order for the client 204a-204N to open the attached document a decryption key must be downloaded, as described above. In this example, requesting the decryption key may trigger the updating of the behavioural data database 210.

Alternatively, or additionally, the clients 204a-204N may update the behavioural data database 210 each time a text-based message is transmitted or received at the client 204a-204N, or a document attached to a text-based message is opened or accessed at the client 204a-204N. For example, the client 204a-204N, or the document viewing application stored on the client 204a-204N and utilized to open an attached document, may be configured to cause the behavioural data database 210 to be updated when an attached document is downloaded.

According to the present disclosure, the behavioural data stored in the behavioural data database 210 is utilized to predict whether a recipient is likely to open an attached document at a particular portable electronic device 100 associated with that recipient to the text-based message being transmitted to the recipients. If the recipient is predicted to be likely to open an attached document at a particular portable electronic device, the messaging server 202 may cause the attached document to be automatically uploaded to the portable electronic device 100 when the text-based message is transmitted such that the recipient does not later have to wait for the document to be downloaded in order to open the attachment.

Figure 3:
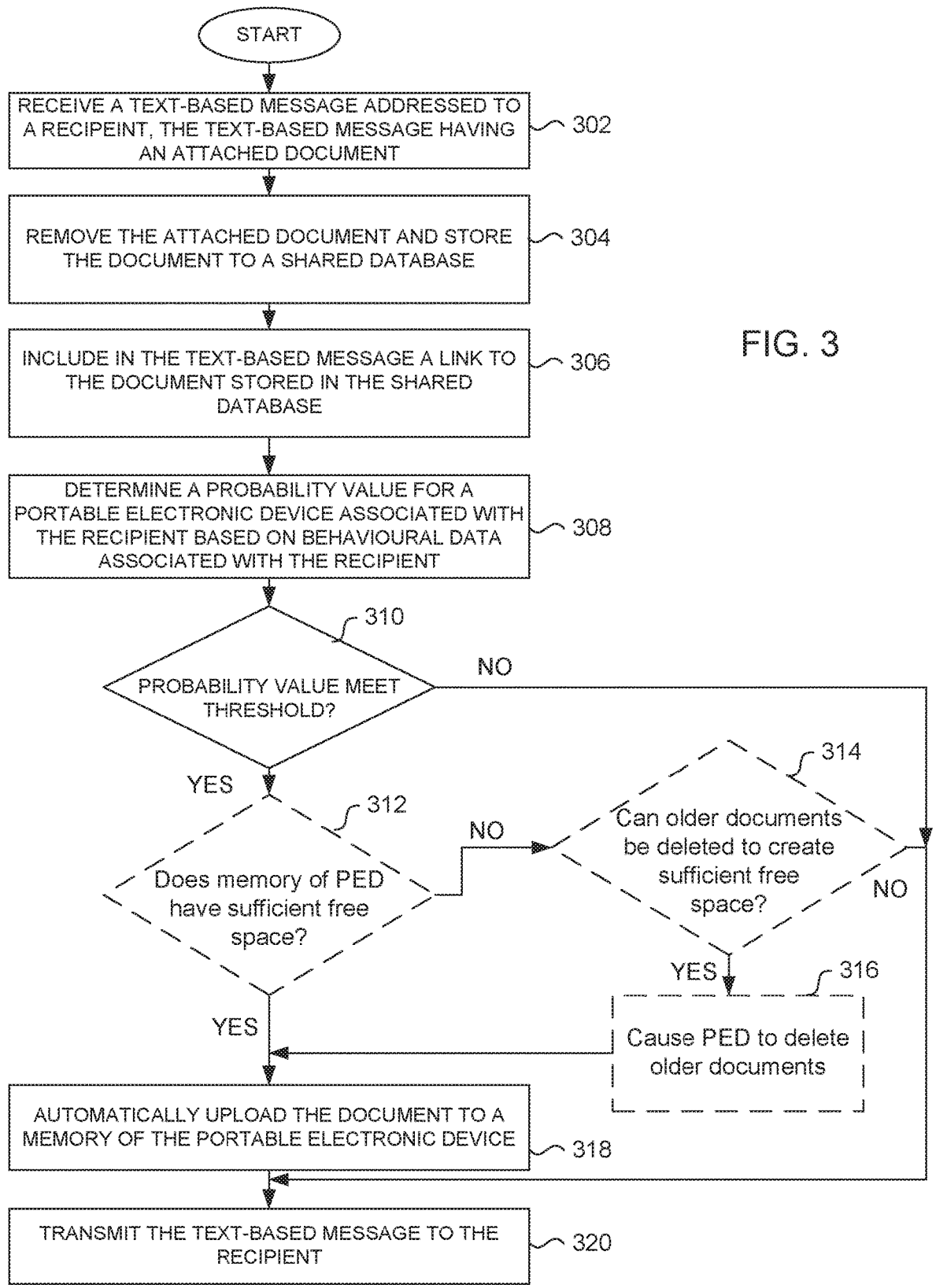
FIG. 3 is a flow chart illustrating a method of uploading a document attached to a text-based message to a portable electronic device in accordance with the disclosure; and FIG. 4A

A flowchart illustrating a method for automatically uploading a document attached to a text-based message email to be transmitted is shown in FIG. 3. The method may be performed at, for example, the messaging server 202 that receives an email from one of the clients 204a-204N to be transmitted to a recipient. Alternatively, the method may be performed by the client 204a-204N at which the text-based message is sent from prior to transmitting the text-based message to the message server 202.

At 302, a determination is made that the text-based message to be sent from a sender to a recipient includes an attached document. In response to determining that the text-based message includes an attached document, the document is optionally removed from the text-based message and stored to a shared database at 304. The shared database may be, for example, the document database 208 described previously. If optional step 304 is performed, then the process moves to 306 and the text-based message is modified to include a link to the document that was stored in the shared database at 304.

If the optional steps 304 and 306 are not performed, or after a link to a stored document is optionally included at 306, the process continues to 308 and a probability value is determined for a portable electronic device 100 associated with a recipient of the text-based message based on at least behavioural data, such as the behavioural data stored in the behavioural data database 210 previously described. The behavioural data utilized to determine the probability value may be associated with the recipient and the portable electronic device 100 associated with the recipient. Different types of behavioural data may be associated with the recipient and the portable electronic device. The different types of behavioural data may include, for example, whether the recipient has previously opened an attachment at portable electronic device, how frequently the recipient has previously opened attachments at the portable electronic device, how frequently the recipient has previously opened at the portable electronic device 100 attachments sent from the sender of the current text-based message, and whether the recipient has been active within a thread in which the current text-based message is included, and whether the user has recently opened an attached document on the portable electronic device. A user may be considered to be active in a thread based on, for example, the percentage of text-based messages in the thread that have been sent by the user. For example, a user may be active if they have sent at least a threshold percentage of 10% of the text-based messages of the thread in the previous 30 days, or 25% of the text-based messages of the thread over the entire lifetime of the thread.

As described in more detail below, the probability value is number or score that represents the likelihood that a recipient is likely to open the attached document at a portable electronic device 100 associated with the recipient. In an example, the probability value may vary within a range. For example, the probability value may vary between −100 and +100, with positive values indicating that a recipient is likely to open a document at the portable electronic device 100 and negative values indicating that the recipient is not likely to open the document at the portable electronic device 100.

In an example, the probability value may be determined by first setting the probability value to a default value, then adjusting the value up or down based on the behavioural data. The default value may be set to, for example, the middle of the range. For example, if the range of the probability value is 0 to 100, the default value may be set to 25. For example, if, based on the behavioural data, the recipient generally opens attached documents on the portable electronic device 100, then the probability value may be increased from the default value, indicating a greater likelihood that the recipient will open currently attached document on the portable electronic device. Conversely, if, based on the behavioural data, the recipient generally does not open attached documents on the portable electronic device 100, then the probability value may be decreased, indicating a greater likelihood that the will not open the currently attached document on the portable electronic 100.

As described in more detail below, this adjusting of the probability value may be performed for each of several different types of behavioural data. For example, the adjustment that may be performed for each type of behavioural data may be based on the frequency, or percentage of the times, that the recipient previously opened attachments in accordance with that behavioural type. The frequency or percentage may be a weighted average with more recent events in which an attached document was opened being weighted higher than older events.

The different types of behavioural data may be differently weighted such that some types of behavioural data results in a greater adjustment than other types of behavioural data. Higher weighting indicates that the higher weighted type of behavioural data is considered to be a better indicator of the recipient's likelihood to open the attachment at the portable electronic device 100 than lower weighted type of behavioural data. For example, behavioural data associated with the frequency, or a percentage of the times, that the recipients previously opened attachments from the sender of the current text-based message may be weighted higher than the behavioural data associated with the user recently having opened an attachment generally. For example, weighting may be provided by adjusting the probability value by a product of a weighting factor and the average percentage associated with each type of behaviour data. For example, the different types of behavioural data may be weighed as "very high", having a weighting factor of 0.8, "high" having a weighting factor of 0.6, "medium" having a weighting factor of 0.4, and "low" having a weighting factor of "0.2".

A recipient may have multiple portable electronic devices that receive text-based messages. In this case, a separate probability value may be determined for each portable electronic device 100 associated with the recipient. Further, a text-based message may be sent to multiple recipients and, in this case, a separate probability value may be determined for each portable electronic device 100 associated with each recipient of the text-based message.

In addition to determining the probability value based on behavioural data, other information may optionally be utilized to determine the probability value. For example, a determination of whether the attached document includes a comment directed to the user may be utilized to determine the probability value. Further, determining the probability value at 308 may also be based on a natural language processing (NLP) based heuristics analysis of the content of the text-based message. The NLP analysis is utilized to determine, for example, an intention for an attached or linked document by searching for keywords such as, for example, "review", "revise", "provide comment", and the like. For example, if the text-based message includes the terms "review", or "provide comments", then it may be determined that the recipient will access the document and is therefore more likely that the recipient may access the document at a portable electronic device 100. NLP based heuristic analysis of a chain of text-based messages back and forth may be utilized to determine intent to open an attached document. For example, if the document is attached to, or linked to, a text-based message sent in reply to a text-based message requesting the attached document "for review", then the NLP based heuristics analysis may determine that the recipient intends to access the attached document and therefore has a greater likelihood of accessing the document on a portable electronic device 100.

At 310, the determined probability value is compared to a threshold to determine whether the probability value meets the threshold. The probability value may be determined to meet the threshold if, for example, the probability value is equal to or exceeds the threshold. The threshold may be a default value or may be set by a user of the portable electronic device 100. The threshold may be, for example, 70%.

If the probability value does not meet the threshold at 310, then the process proceeds to 320 and the text-based message is sent to the recipient. If the probability value is determined to meet the threshold, the process may optionally proceed to 312 and a determination is made whether a memory 110 of a portable electronic device (PED) 100 associated with a recipient has sufficient free space to store the attached document in the memory 110. The free space available may be based on, for example, free space available in the memory 110 as a whole, or on a predetermined memory limit associated with documents stored on the device, or both. The predetermined memory limit may be associated with, for example, a document access application on the client 204a-204N.

For example, if the attached document is 2 megabytes (MB) in size, but the memory 110 of the portable electronic device 100, or the predetermined memory limit, has only 1

MB of free space available, then the portable electronic device 100 would be determined not to have sufficient free space. However, if the available free space in the memory 110, or the predetermined memory limit, was 2 MB or greater, than the determination at 312 would be that the memory 110 has sufficient free space.

If the memory 110 of the portable electronic device 100 is determined not to have sufficient free space at optional step 312, then the process moves to 314 and a determination is made whether documents stored in the memory 110 may be deleted in order to create sufficient space. If documents are determined to be available for deletion to create sufficient free space at 314, then the process continues to 316 and the documents are deleted from the memory 110 to create free space.

The deletion of documents at 316 may be based on, for example, a Least Recently Used cache. For example, deleting documents at 316 may be performed by first deleting documents that are stored in the memory 110 that have never been opened. If sufficient free space is still not available after deleting the never opened documents, then documents may be sequentially deleted until there is sufficient free space available, with documents not accessed for the longest period of time deleted first. A user may designate certain documents as "locked", or "pinned", such that locked documents will not be automatically deleted even if the document has never been opened or is that document that has not been accessed for the longest period of time. The determinations at 314 and 316 may be limited to, for example, documents associated with the document access application, as described above, such that the only documents that may be deleted are locally stored copies of documents are stored in the documents database 208.

If no documents are found that can be deleted at 314, or if the deletion of the documents would not create sufficient free space, then the process moves to 320 and the text-based message is sent to the recipient.

Once the documents are deleted at 316, or if the optional steps 312 through 316 are not performed, the process continues at 318 and the portable electronic device 100 is caused to automatically download the attached document to the memory 110. When the method is performed by the text-based message server 202, causing the portable electronic device 100 to download the document to the device may be performed, for example, by a background push message sent to the portable electronic device 100 via a document access application stored on the portable electronic device 100. The background push message to the document access application notifies the document access application to download the document. Alternatively, if, for example, background push or other background signaling with the document access application is not available, then the application may receive a notification from the text-based message server 202 and download the attached document when the document access application is opened.

The document access program that downloads the attached document may include settings, for example, restrict the type of data connection that may be utilized for downloading documents. For example, downloading documents may only be permitted when the portable electronic device 100 is connected to a WIFI network, in which the attached document may not be downloaded until a WIFI connection is available.

At the 320, the text-based message is transmitted to the recipient. Although the flow chart shows that the document is uploaded at 318 before the text-based message is transmitted at 320, in practice these steps may be performed at the same time, or the text-based message may be transmitted before the document is uploaded to the portable electronic device 100 in the event that the document is uploaded to the portable electronic device 100 is delayed such as, for example, by any of the above described scenarios.

Figure 4A:
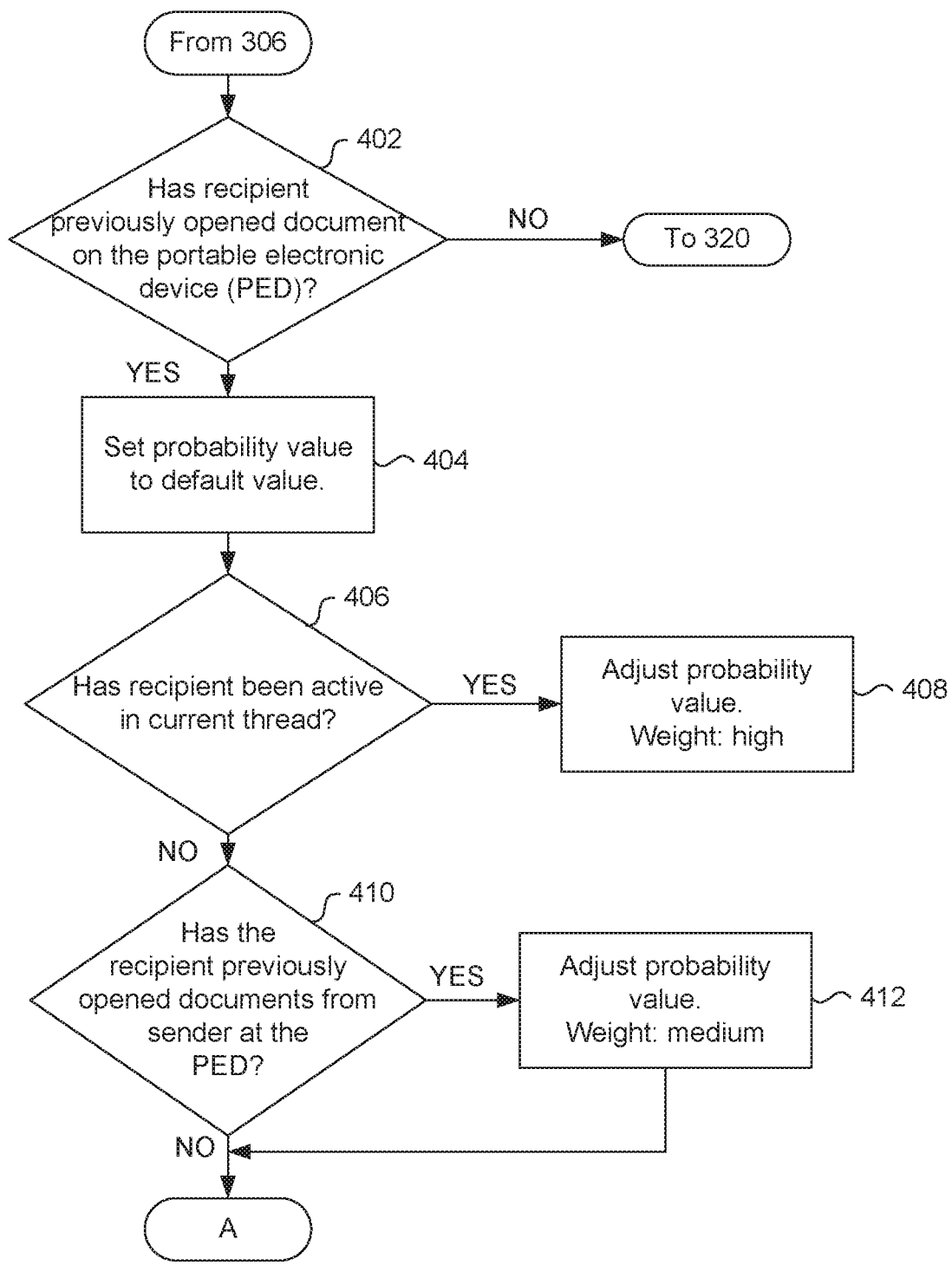
FIG. 4B is a flow chart illustrating an example method of determining a probability value in accordance with the flowchart of FIG. 3.
Figure 4B:
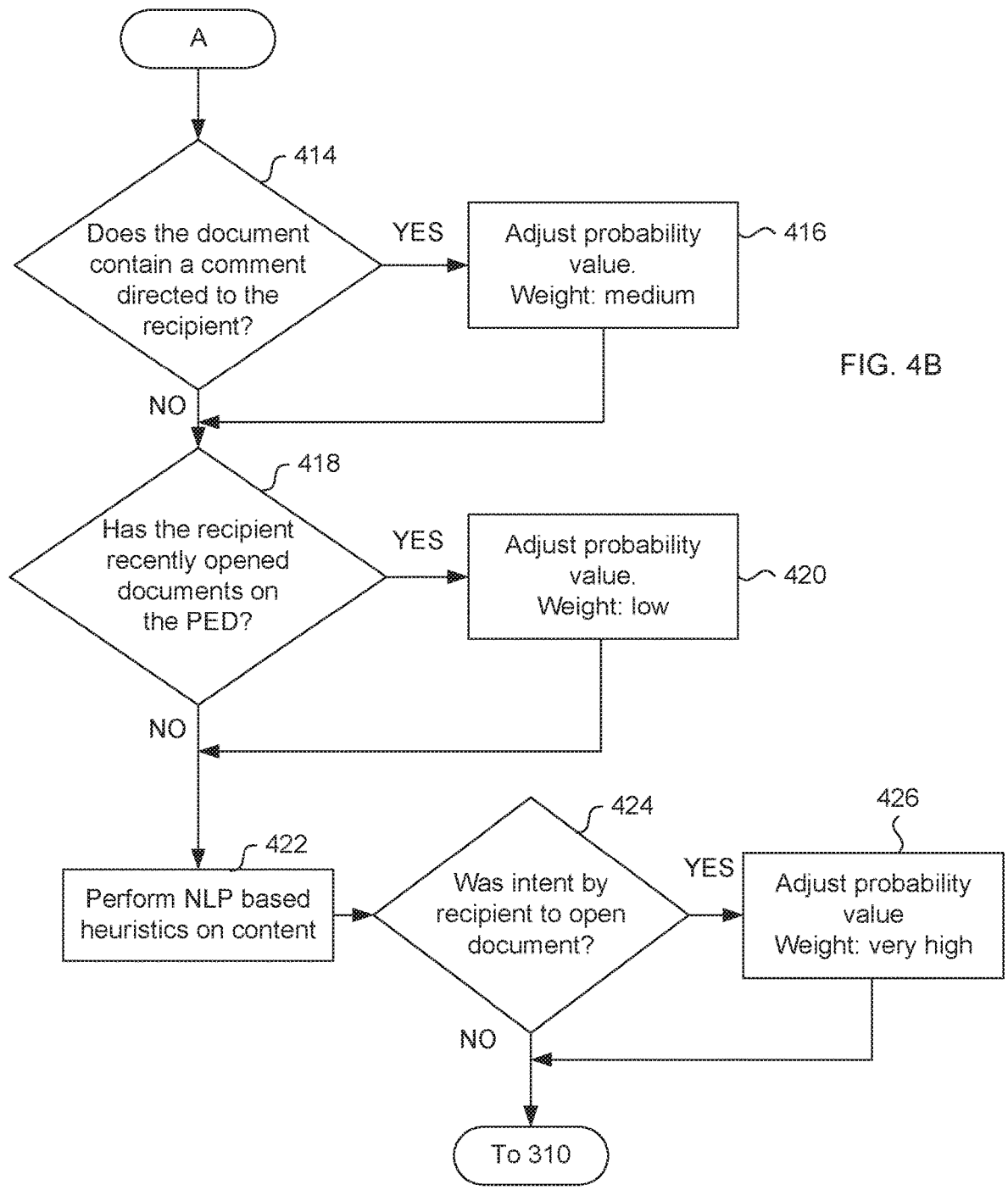

An example method for determining a probability value at 308 is shown in the flowchart in FIG. 4A and FIG. 4B. The example method shown in FIG. 4A and FIG. 4B illustrates one possible method for determining the probability value based on behavioural data, and other data, as described previously. The method shown in FIG. 4A and FIG. 4B may be performed at, for example, the messaging server 202 that receives an email from one of the clients 204a-204N to be transmitted to a recipient. Alternatively, the method shown in FIG. 4A and FIG. 4B may be performed by the client 204a-204N at which the text-based message is sent from prior to transmitting the text-based message to the message server 202.

As described above, determining at 308 may include determining multiple probability values each associated with a respective portable electronic device 100 associated with a recipient. In this case, the example method shown in FIG. 4A and FIG. 4B may be performed for each of the probability values determined at 308.

At 402, a determination is made whether the recipient has previously opened a document at the portable electronic device. If the recipient is determined not to have previously opened an attached document at the portable electronic device, the process proceeds to 320 and the text-based message is transmitted without uploading the document to the portable electronic device.

If the recipient is determined to have previously opened an electronic document at the portable electronic device 100 at 402, then the process proceeds to 404 and the probability value is set to a default value. For example, the range of the possible values of the probability value may be 0 to 100, and the default value may be set to the percentage of attached documents received by the recipient that the recipient opens all devices, not just the portable electronic device 100 for which the probability value is being calculated for. In an example, the percentage of attached documents opened by the recipient on all devices is 25%, and the default is be set to 25%.

At 406, a determination is made whether the recipient has been active in the current thread in which the current text-based message is included. As described above, the recipient may be determined to be active in thread if, for example, the recipient has send particular number, e.g., 10%, of the total text-based messages of the thread within a certain recent time period, e.g., the last 30 days. Alternatively, or additionally, the recipient may be determined to be active in thread if, for example, the recipient has send particular number, e.g., 25%, of the total text-based messages of the thread during the lifetime of the thread.

If the recipient is determined to be active in the thread at 406, the process moves to 408 and the probability value is adjusted. The adjustment that is applied at 406 may be based on, for example, the percentage of text-based messages in the thread that were sent by the recipient. The weighting applied to the adjustment at 408 in the example shown in FIG. 4A is "high", indicating that a recipient who is active in a thread to which the current text-based message is included is considered highly likely to a document attached to the current text-based message. For example, the high weighting factor may be a multiplicity factor of 0.6 that is applied to the determined percentage of text-based messages of the thread that are sent by the recipient.

Continuing the above example in which the default value is 25%, if the percentage of text-based messages of the thread sent by the recipient is 40% and the weighting factor applied is 0.6, then the adjustment applied at 408 is (0.6)(40%)=24%. Therefore, the adjusted probability factor after adjustment at 408 is 25%+24%=49%.

If the recipient is determined not have been active in the thread at 406, or after the adjustment is performed at 408, the process moves to 410 and a determination of whether the recipient has previously opened documents from the sender at the portable electronic device. The determination at 410 may include determining a frequency at which the recipient has previously opened, at the portable electronic device, documents attached to text-based messages received from sender.

If the user is determined to have previously opened an attached document received from the sender determination at 410, the process continues at 412 and the probability value is adjusted. The probability value may be adjusted at 412 by an amount that is based on, for example, the percentage of the percentage of attached documents received from the sender that the recipient has previously opened at the portable electronic device 100. The weighting applied to the adjustment at 412 in the example shown in FIG. 4A is "medium", indicating that the recipient previously opening an attached document received from the sender is moderately relevant when determining the likelihood that the recipient will open the document attached to the current text-based message.

Continuing the above example, if the recipient has previously opened 1% of the documents attached to text-based messages from the sender, and the weighting factor is 0.4, then the adjustment that is applied is (0.4)(1%)=0.4%. Therefore, the probability value after adjustment at 412 in this example is 49%+0.4%=49.4%.

If the recipient is determined at 410 not have previously opened a document attached to a text-based message received from the sender, or after performing the adjustment at 412, the process proceeds to 414, shown in FIG. 4B, and a determination of whether the document attached to the current text-based message includes a comment directed to the recipient. This type of determination may be performed if the format of the attached document supports designating a comment towards a particular user by, for example, using an "@userID" designation, where "userID" represents the user identification for the person to which the comment is directed. The determination at 414 is not based on behavioural data, but rather is a determination based on the content of the attached document itself. The determination at 414 may be performed by, for example, performing a mapping between the userID and the email address for the user such that the comments directed to a particular userID can be associated with particular recipient's email addresses.

If the document is determined at 414 to include a comment directed to the recipient, the process proceeds to 416 and the probability value is adjusted. The probability value may be adjusted at 416 by, for example, a configurable fixed value that may be a default value or a value set by a user. The weighting applied to the adjustment at 416 in the example shown in FIG. 4B is "medium", indicating that an attached document including a comment directed to the recipient is moderately relevant when determining the likelihood that the recipient will open the document attached to the current text-based message.

Continuing the above example, if a comment is directed to the recipient and the configurable fixed value is 20%, and the weighting factor is 0.4, then the adjustment amount is (0.4)(20%)=5%. Therefore, the adjusted probability value after the adjustment at 416 is 49.4%+5%=54.4%.

If the document is determined not to include a comment directed at the recipient at 414, or after performing the adjustment at 416, the process proceeds to 418 and a determination of whether the recipient has recently opened an attached document at the portable electronic device 100 is made. The determination at 418 may be made by determining, for example, whether the recipient has opened an attached document at the portable electronic device 100 within a predetermined time period. The predetermine time period may be a default time period, such as, for example, 30 days, or may be a time period set by a user of the portable electronic device.

If the recipient is determined to have recently opened an attached document at 418, the process proceeds to 420 and the probability value is adjusted. The probability value may be adjusted at 420 by, for example, the percent of attached documents that the recipient has opened at the portable electronic device 100 within the predetermined time period. The weighting applied to the adjustment at 420 in the example shown in FIG. 4B is "low", indicating that recently opening an attached document on the portable electronic device 100 has a relatively low relevance when determining the likelihood that the recipient will open the document attached to the current text-based message.

Continuing the above example, if the recipient opened, for example, 8% of all documents attached to text-based messages received during predetermined time period of the previous 30 days, and the weighting factor is 0.2, then the adjustment performed at 420 is (0.2)(8%)=1.6%. Therefore, the adjusted probability value after the adjustment at 420 is 54.4%+1.6%=56%.

If the recipient is determined not to have recently opened an attached document at 418, or after performing the adjustment at 420, the process continues to 422 and NLP based heuristics analysis is performed on the contents of the text-based message. After performing the NLP based heuristics analysis on the contents of the text-based message, a determination is made at 424 whether based on the NLP based heuristics analysis, the content indicates an intention for the recipient to open the attached document. As disclosed above, this intention may be determined based on whether particular keywords or phrases are included in the content of the text-based message.

If the determination at 424 is yes, then the probability value is adjusted based on the intent at 426. For example, if a determination at 424 is that the content includes an intention that the recipient open the attached document, then the probability value is adjusted at 426. The NLP analysis will result in a score or probability value related to an intent to open the attached document. The determined score may be positive, indicating an intent to open the attached document was determined at 424, which results in the probability value being adjusted upward at 426. Additionally, the determined score may be negative, indicating an intent not to open the attached document was determined at 424, which results in the probability value being adjusted downward at 426. The weighting applied to the adjustment at 426 in the example shown in FIG. 4B is "very high", indicating that an intention determined by NLP based heuristics analysis of the content of the text-based message is extremely relevant when determining the likelihood that the recipient will open the document attached to the current text-based message.

Continuing the above example, if the determination at 424, based on the NLP based heuristical analysis performed at 422, is an intent to open the document with a score of 30%, and if the "very high" weighting factor is 0.8, then the adjustment amount at 426 is (0.8)(30%)=24%. Therefore, the adjusted probability score after the adjustment at 426 is 56%+24%=80%.

If no intention was determined at 424, or after performing the adjustment at 426, the process proceeds to 310 of the method shown in FIG. 3. As described above, a determination whether the determined probability value meets a threshold is made at 310. Continuing the above example, if the threshold is set at, for example, 70%, then the determined probability value of 80% is determined to meet the threshold at 310.

The illustrative example shown in FIG. 4A and FIG. 4B is one method that the probability value may be determined at 308. However, other methods will be apparent to a person skilled in the art. For example, a fewer number of types of behavioural data may be utilized, or other types of behavioural data than those shown in the FIGS. 4A and 4B, may be utilized. Further, the steps shown in FIG. 4A and FIG. 4B may be performed in a different order than shown. The weights associated with the adjustments performed at the steps 408, 412, 416, 420, and 426 shown in FIGS. 4A and 4B may be different than the weighting described above. Additionally, rather than rather than utilizing the adjustments described above for performing adjustments at steps 408, 412, 416, 420, and 426, other adjustments based on the behavioural data may be utilized. For example, the probability value may be adjusted by a set amount associated with each type of behavioural data. Further, percentages of each type of behavioural data utilized for the adjustment amounts at steps 408, 412, and 420 as described above may, themselves, be determined based on a weighted average of the behavioural data such that more recent behavioural data is weighted more than older behavioural data.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A method for an electronic device for sending and receiving text-based messages, the method comprising:
   determining that a text-based message to be sent from a sender to a recipient includes a document attached thereto;
   for each portable electronic device associated with the recipient, determining a probability value associated with that portable electronic device that indicates a likelihood of the recipient opening the attached document at that portable electronic device, wherein determining the probability value is based at least on behavioural data related to how frequently the recipient has previously opened at that portable electronic device documents attached to previous text-based messages associated with the recipient;
   in response to determining that the probability value associated with a particular portable electronic device associated with the recipient meets a threshold, causing the particular portable electronic device to automatically download the attached document to a memory of the particular portable electronic device associated with the recipient; and
   transmitting the text-based message to each portable electronic device associated with the recipient;
   wherein the text-based message is associated with a thread of previous text-based messages, and wherein the probability value is further based on whether the recipient has been active in the thread of previous text-based messages, and
   wherein the recipient has been active in the thread of previous text-based messages if a percentage of the previous text-based messages of the thread that the recipient is the sender meets a predetermined percentage threshold.

2. The method according to claim 1, further comprising:
   removing the attached document from the text-based message and storing the attached document in a shared database; and
   including, in the text-based message, a link to the document stored in the shared database;
   wherein causing the particular portable electronic device to automatically download the attached document comprises causing the particular portable electronic device to automatically download the attached document from the shared database.

3. The method according to claim 1, wherein, for each portable electronic device associated with the recipient, the probability value associated with that portable electronic device is based on whether the recipient has previously opened, at that portable electronic device, a previous document attached to a previous text-based message from the sender.

4. The method according to claim 1, wherein, for each portable electronic device associated with the recipient, the probability value associated with that portable electronic device is based on whether the recipient has previously opened, at that portable electronic device, a previous document attached to a previous text-based message within a predetermined time period.

5. The method according to claim 1, wherein the probability value is further based on whether the attached document includes a comment directed to the recipient.

6. The method according to claim 1, wherein the probability value is further based on an intent determined by performing natural language processing based heuristics on the content of the text-based message.

7. The method according to claim 1 further comprising determining whether the memory of the particular portable electronic device includes sufficient free memory space to store the attached document;
wherein causing the particular portable electronic device to automatically download the attached document to the memory is performed in response to determining that the memory of the particular portable electronic device includes the sufficient free memory space; and
in response to determining that the memory of the particular portable electronic device does not include the sufficient free memory space:
determining whether any stored documents stored in the memory may be deleted from the memory to create the sufficient free memory space; and
in response to determining that the memory includes stored documents that may be deleted from the memory to create the sufficient free memory space, causing the particular portable electronic device to delete to the determined stored documents prior to causing the particular portable electronic device to automatically download the attached document to the memory.

8. An electronic device for sending and receiving text-based messages, the electronic device comprising a processor configured to:
determine that a text-based message to be sent from a sender to a recipient includes a document attached thereto;
for each portable electronic device associated with the recipient, determine a probability value associated with that portable electronic device that indicates a likelihood of the recipient opening the attached document at that portable electronic device, wherein determining the probability value is based at least on behavioural data related to how frequently the recipient has previously opened at that portable electronic device documents attached to previous text-based messages associated with the recipient;
in response to determining that the probability value meets a threshold associated with a particular portable electronic device associated with the recipient, cause the particular portable electronic device to automatically download the attached document to a memory of the particular portable electronic device associated with the recipient; and
transmit the text-based message to each portable electronic device associated with the recipient;
wherein the text-based message is associated with a thread of previous text-based messages, and wherein the probability value is further based on whether the recipient has been active in the thread of previous text-based messages, and
wherein the recipient has been active in the thread of previous text-based messages if a percentage of the previous text-based messages of the thread that the recipient is the sender meets a predetermined percentage threshold.

9. The electronic device according to claim 8, wherein the processor is further configured to:
remove the attached document from the text-based message and storing the attached document in a shared database; and
include, in the text-based message, a link to the attached document stored in the shared database;
wherein to cause the particular portable electronic device to automatically download the attached document, the processor is configured to cause the particular portable electronic device to automatically download the attached document from the shared database.

10. The electronic device according to claim 8, wherein, for each portable electronic device associated with the recipient, the probability value associated with that portable electronic device is based on whether the recipient has previously opened, at that portable electronic device, a previous document attached to a previous text-based message from the sender.

11. The electronic device according to claim 8, wherein, for each portable electronic device associated with the recipient, the probability value associated with that portable electronic device is based on whether the recipient has previously opened, at that portable electronic device, a previous document attached to a previous text-based message within a predetermined time period.

12. The electronic device according to claim 8, wherein the probability value is further based on whether the attached document includes a comment directed to the recipient.

13. The electronic device according to claim 8, wherein the probability value is further based on an intent determined by performing natural language processing based heuristics on the content of the text-based message.

14. The electronic device according to claim 8, wherein the processor is further configured to:
determine whether the memory of the particular portable electronic device includes sufficient free memory space to store the attached document;
wherein to cause the particular portable electronic device to automatically download the attached document is performed in response to a determination that the memory of the particular portable electronic device includes the sufficient free memory space; and
in response to the determination that the memory of the particular portable electronic device does not include the sufficient free memory space:
determine whether any stored documents stored in the memory may be deleted from the memory to create the sufficient free memory space; and
in response to the determination that the memory includes stored documents that may be deleted from the memory to create the sufficient free space, cause the particular portable electronic device to delete to the determined stored documents prior to causing the particular portable electronic device to automatically download the attached document to the memory.

* * * * *